Figure 1:
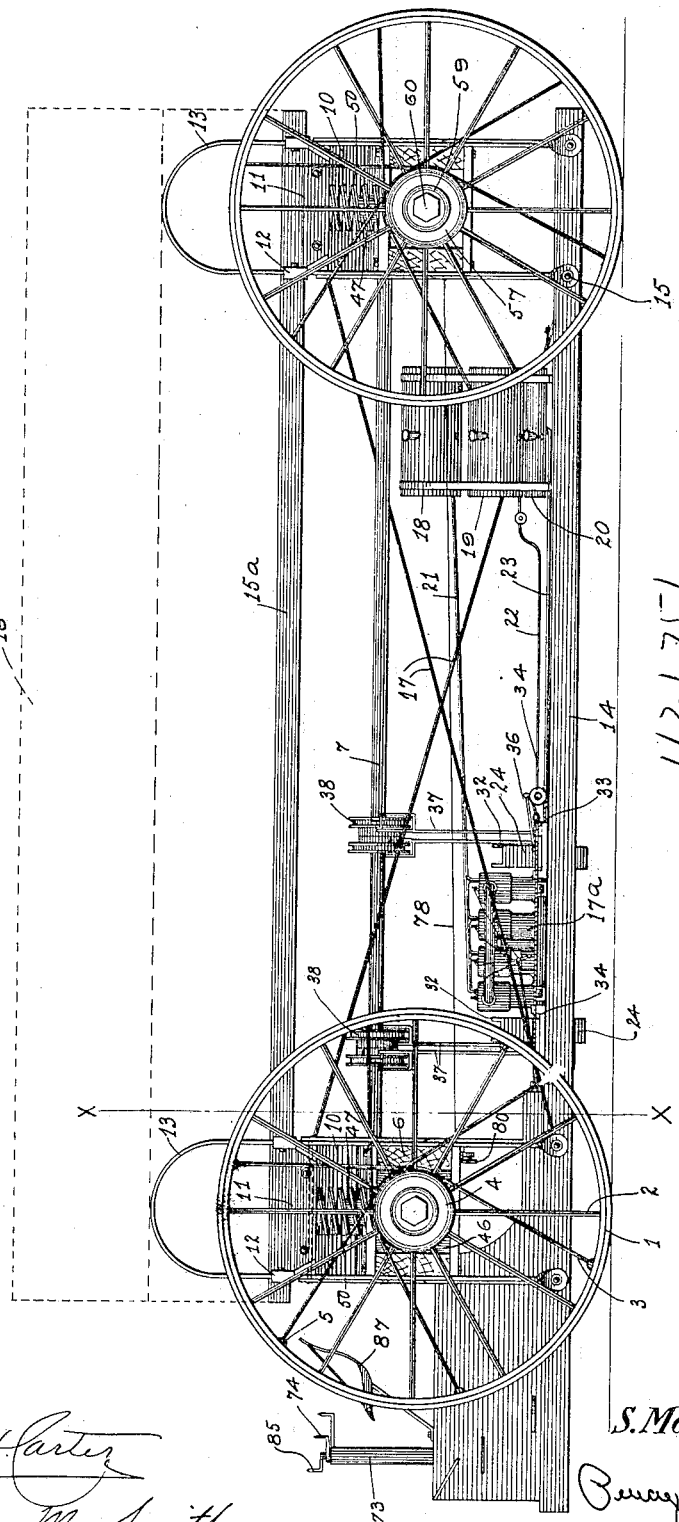

S. MONTGOMERY.
HORSELESS FARM VEHICLE.
APPLICATION FILED FEB. 26, 1913.

1,121,751.

Patented Dec. 22, 1914.
5 SHEETS—SHEET 2.

WITNESSES:
Frank H. Carter
Clarence M. Smith

INVENTOR
S. Montgomery
BY
Percy S. Webster
ATTORNEY

S. MONTGOMERY.
HORSELESS FARM VEHICLE.
APPLICATION FILED FEB. 26, 1913.
1,121,751.
Patented Dec. 22, 1914.
5 SHEETS—SHEET 3.
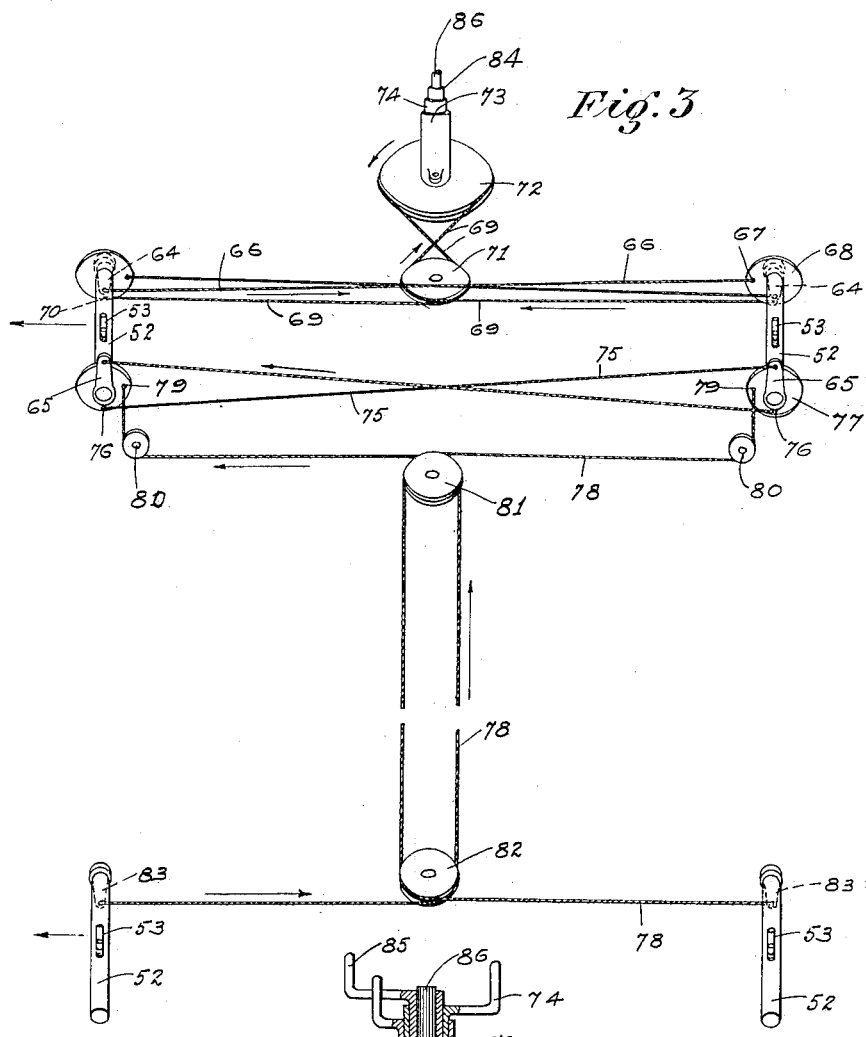
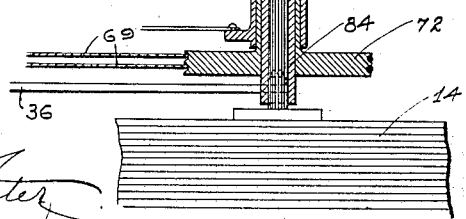

S. MONTGOMERY.
HORSELESS FARM VEHICLE.
APPLICATION FILED FEB. 26, 1913.
1,121,751.
Patented Dec. 22, 1914.
5 SHEETS—SHEET 4.
Fig. 5
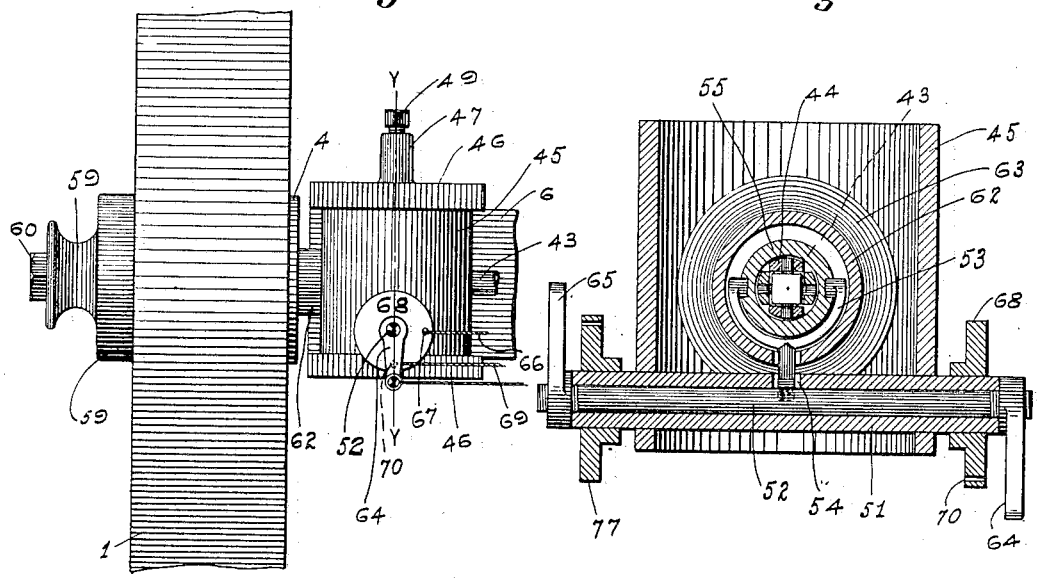
Fig. 6
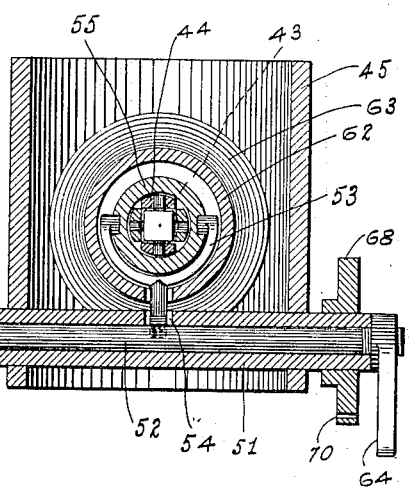
Fig. 7
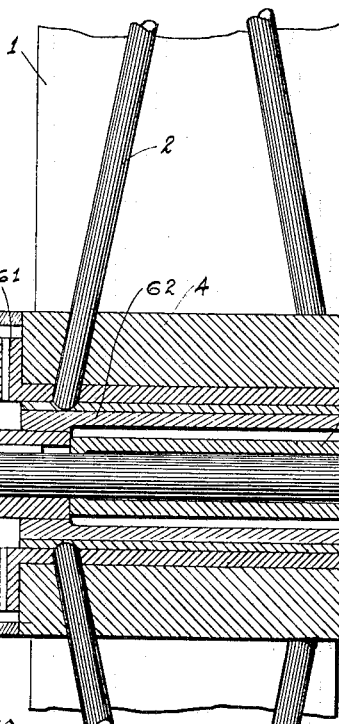
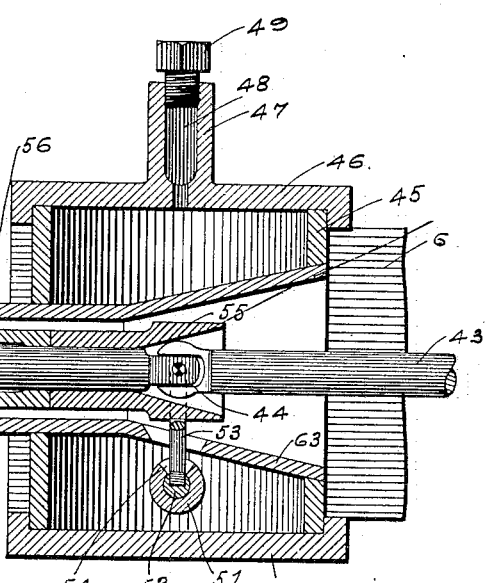
Witnesses
Frank H. Carter
Clarence M. Smith
Inventor
S. Montgomery
Percy S. Webster
Attorney

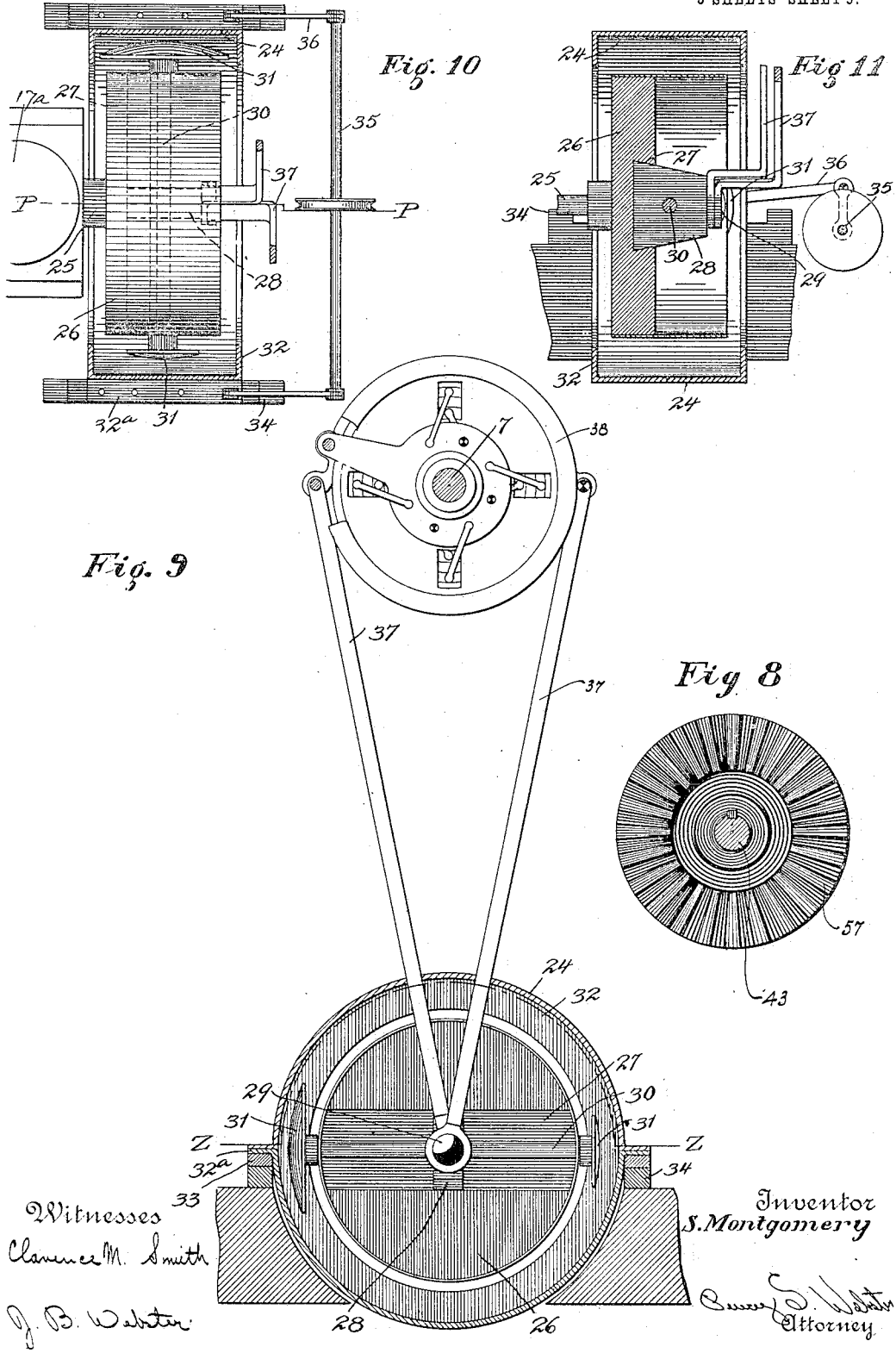

UNITED STATES PATENT OFFICE.

SAMUEL MONTGOMERY, OF PORTLAND, OREGON.

HORSELESS FARM-VEHICLE.

1,121,751.  Specification of Letters Patent.  Patented Dec. 22, 1914.

Application filed February 26, 1913. Serial No. 750,783.

*To all whom it may concern:*

Be it known that I, SAMUEL MONTGOMERY, a citizen of the United States, residing at Portland, in the county of Multnomah, State of Oregon, have invented certain new and useful Improvements in Horseless Farm-Vehicles; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in horseless vehicles and is particularly designed as a horseless farm wagon adapted to be operated by a standard explosive motor the wagon being so constructed that the bed of the same will project in such a manner as to be easily accessible for loading and unloading, and one which will maintain a strictly horizontal position regardless of whether or not the wheels are in a level position with respect to each other.

A further object of the invention is to produce a broad wheeled vehicle susceptible of riding over all kinds of soils without sinking therein and also which will ride over roads easily and without forming chuck holes or other uneven surfaces.

A further object of the invention is to produce a vehicle which will have a driving connection with all four of the wheels to provide a powerful traction for the vehicle in order to enable it to carry heavy loads in a rapid and efficient manner.

A further object of the invention is to produce a simple and inexpensive device and yet one which will be exceedingly effective for the purposes for which it is designed.

These objects, I accomplish by means of such structure and relative arrangement of parts as will fully appear by a perusal of the following specification and claims.

In the drawings similar characters of reference indicate corresponding parts in the several views.

Figure 2:
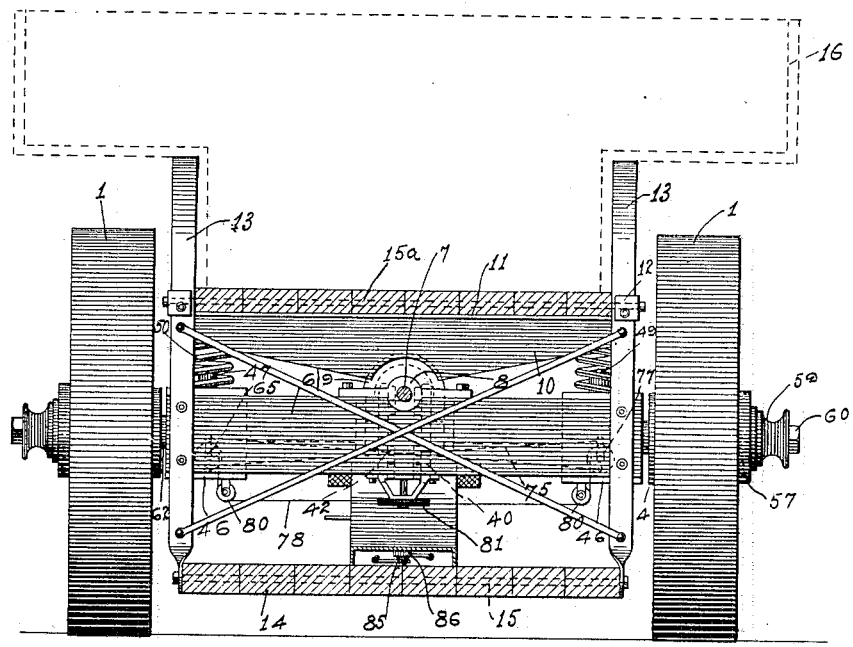
Figure 12:
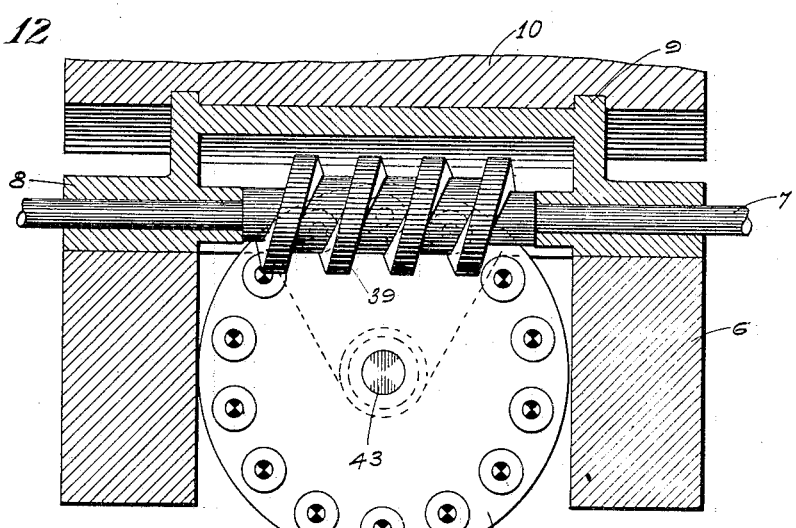

Figure 1 is a side elevation of the complete wagon. Fig. 2 is a cross section taken on a line X—X of Fig. 1. Fig. 3 is a diagrammatic view of a steering mechanism. Fig. 4 is a sectional view of engine and steering control handles. Fig. 5 is a fragmentary view of a clutch operating mechanism. Fig. 6 is a sectional view taken on a line Y—Y of Fig. 5. Fig. 7 is a longitudinal section of Fig. 5. Fig. 8 is a front elevation of a clutch member. Fig. 9 is a view showing the engine and operating clutches. Fig. 10 is a sectional view taken on a line Z—Z of Fig. 9. Fig. 11 is a sectional view taken on a line P—P of Fig. 10. Fig. 12 is a view of a worm and wheel.

Referring now more particularly to the characters of reference on the drawings, the numeral 1 represents wheels of a large diameter having staggered spokes 2, and as an additional strengthening means, brace members 3 are disposed at intervals, being bent somewhat around the hub 4 and suitably secured in sockets 5 in the rim of the wheel 1. On either side of said hub 4, and spaced apart, are beams 6, extending across the entire distance between said wheels 1. A shaft 7 runs lengthwise of the wagon and midway between said beams and extending over them, being journaled thereon by boxings 8 on beams 6. Swivelly mounted on said boxings 8 and kept in alinement thereon by flanges 9 on said boxings, are two bolsters 10. Across these are placed flat pieces of metal 11 bent at their ends as at 12 thereby gripping supporting members 13, each of said members 13 being composed of a flat bar of iron curved at the top and running down on either side of a pair of the beams 6 to a point near the ground where the ends are half twisted to form a flat surface to support a platform 14 running the entire length of the wagon, bolts 15 running through from side to side to form a supporting means for the planks of which the platform 14 is built up. Lengthwise across bolsters 10 extends a similar platform 15ª, this forming the bed to carry the merchandise, sides 16 being added thereto if required. Braces 17 crossing diagonally help to steady the wagon.

Situated toward the front end of the wagon, on platform 14 is a gas engine 17ª having supply tanks for water, gas, and oil, 18, 19, and 20 respectively, suitably located on platform 14 and connected with the various points on the engine by pipes 21, 22 and 23. Located at either end of said engine are slidable shields 24, into which the shaft 25 of engine 17ª enters. On the ends of said shaft 25 are disks 26. Diametrically cut in the faces of the same are dovetail grooves 27 into which are fitted blocks 28 having wrist pins 29 secured therein. Parallel with said grooves 27 and extending beyond the disks 26 are shafts 30 being threaded for half their length, the threaded portion running through and engaging similar threads in block 28. On the ends of shafts 30 are disks 31, one being somewhat smaller than the other for the purpose as will appear.

Shields 24 are provided with flanges 32 adapted to engage the larger of disks 31. Shields 24 are also provided with outside flanges 32ª secured to bars 33, said bars running in guides 34 said guides allowing a lengthwise motion of the shields 24, which are connected to operating levers, hereinafter described, by cross pieces 35 and rods 36.

Connected to wrist pins 29 are rods 37 running to a central location on opposite sides of clutches 38, said clutches operating shaft 7. On either end of said shaft 7, and spaced between said beams 6, are worm gears 39, gearing into worm wheels 40 on each side thereof, said wheels being composed of a plate 41, on which are mounted a plurality of small rollers 42 adapted to engage the spirals of the worm 39, and serving in place of teeth on the worm wheels. Suitably fastened to each worm wheel is a shaft 43, running through the hub 4 of wheels 1 and having a universal joint 44 located therein. Perpendicular to said shaft and located centrally with respect to said universal joint 44 is a circular housing 45 located between said beams 6 and held in position by means of plates 46, said plates being grooved out to receive the ends of the circular housing 45 and being secured to said beams 6. The top one of said members 46 has an upwardly projecting part 47 through which a hole 48 is bored and a set screw 49 fitted for the purpose of filling the said housing 45 with oil and also serving to hold in position springs 50 which are located between said plates 46 and bolsters 10. Running in a sleeve 51 in the lower portion of said member 46 is a shaft 52 having at its middle an upwardly extending fork 53 passing through a slot 54 in said sleeve 51 being diametrically opposite to said shaft 43. The upper ends of said fork 53 engage a short sleeve 55 situated around the universal joint 44 and fitting the said shaft 43 loosely. Following this is a loose sleeve 56 on said shaft 43 extending to, and bearing against a clutch member 57, keyed onto said shaft 43. A spring 58 on said shaft 43 bears against said member 57 and being held in place by a cover 59 having a nut 60 screwed onto said shaft 43, said cover being so made as to be a hoisting drum for a rope if required which may be used independently of the wheels. Said clutch 57 engages a similar clutch 61 forming a part of hub 4. Around said sleeves 56 and 55 and extending through the hub 4 and into said member 45 is a sleeve 62 flaring out at the end as at 63 to allow play of the shaft 43.

The operation of the clutch mechanism as shown by Figs. 5, 6, and 7 is as follows: Taking the two forward wheels on each end of shafts 52 are two small levers, the forward one 64 pointing downward and the rear one 65 pointing upward. Small cables 66 pass from the end of lever 64 to points 67 on disk 68 adapted to turn on sleeves 51 outside of the housing 45, said points 67 being normally located in a line horizontal with the center of shafts 52. Similar cables 69, from points, 70, located 90 degrees down from points 67, pass around a double idler pulley 71 and thence around a double pulley 72 connected to a shaft 73 and having a controlling handle thereon. From the upwardly extending lever 65 cables 75 pass diagonally to points 76 on the lower central point of disks 77. Cables 78 pass from points 79 on disks 77, (said points being located in a similar position to points 67 on disks 68) around small pulleys 80 located directly below around a double pulley 81, thence to and around a double pulley 82 located in a line with downwardly extending levers 83 on the rear pair of shafts 52. Thus it will be seen, for example, that when pulley 72 is turned counter clockwise, as shown by the arrow, one of the cables 69 will pull upward on the lower point 70 on the right hand disk 68, causing point 67 to move still farther upward thus causing cable 66 to pull upwardly on the opposite or left hand lever 64, and said lever 64 in turn causing an outward motion of said fork 53 and causing said fork 53 to press against sleeves 55 and 56, thus pressing clutch 57 out of engagement with said clutch 61. When the pressure on the cables is released, spring 58 sends the clutch back into engagement. At the same time, the left hand lever 65 is caused to turn outwardly, thus pulling on cable and so causing said point 76 on the right hand disk 77 to move upwardly. Point 79 is thus moved farther up, causing a pull on cables 78 thus causing the rear left hand lever 83 to move inwardly and the fork 53 to move outwardly. Thus it will be seen that both clutches on one side are disengaged at the same time and so doing away with the necessity of other steering means.

Located within operating shaft 73, one within the other, as their respective positions may demand, are controlling shafts and handles for spark and carbureter and also a shaft 84 and handle 85, which are connected to rod 36 to control the movement of said shields 24. Running through all these sleeve shafts, and fastened to said platform 14 is a shaft 86 on which shaft the others turn, thus forming a rigid supporting means for the same. Suitably located with regard to this, is the driver's seat 87.

The operation and purpose of the shields 24 and their connected mechanism is as follows, namely: As shown in the drawings, the arms 37 are normally in a neutral position being centrally located with respect to the engine shaft which might be turning and still impart no motion to the wagon. If however, the flanges 32 on one of the said shields 24 are moved by the rod 36 so as to engage the disk 31, then said rod 30 is caused to turn, thus causing the block 28, carrying the rods 37, to move outwardly from the center. This then would impart a crank motion to the same causing an alternate pulling and loosening motion on the clutch above thus causing said shaft 7 to turn. The farther out the said blocks 28 move, the greater will be the radius of motion of the said arms 37 and the greater will be the speed of the said shaft 7 and said wheels. Should it be desired to reduce or stop speed the pull on said rod 36 is reversed, and the flange on the other end is brought to bear on said disk 31 causing a reverse motion in said shaft 30 and said block 28, and so bringing the same back to neutral again if required. The smaller of said disks 31 acts merely as a balance wheel and is smaller so as not to engage the flange 32, which would of course prevent any action. The same operation obtains for both shields 24, and both must of course be operated simultaneously.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

1. A device of the character described, comprising two pair of wheels, a frame mounted between each pair of wheels, a longitudinal shaft journaled across said frames, a bolster pivotally mounted on each of said frames, vertical frames secured to each bolster and supporting a lower platform below said first named frames, a platform supported by said bolsters, springs interposed between said bolsters and said first named frames, a motive means on said lower platform and means operatively connecting said motive means with said wheels, as described.

2. A device of the character described, comprising two frames spaced apart, vertical frames on said first named frames, an upper and lower platform mounted on said vertical frames, a motive means mounted on said lower platform, wheels supporting said first named frames, and means operatively connecting said motive means to said wheels and adapted to drive said wheels, as described.

3. A device of the character described comprising two frames spaced apart, a shaft disposed through each of said frames, wheels mounted on each shaft, a longitudinal shaft journaled across the tops of said frames and adapted to be connected to said first named shafts, an upper and a lower platform, a motor mounted on the lower platform, and a clutch controlled connecting means interposed between said motor and said longitudinal shaft, as described.

In testimony whereof I affix my signature in presence of two witnesses.

SAMUEL MONTGOMERY.

Witnesses:
ROBERT TUCKER,
BERYL CORNELL.